United States Patent Office 3,324,872
Patented June 13, 1967

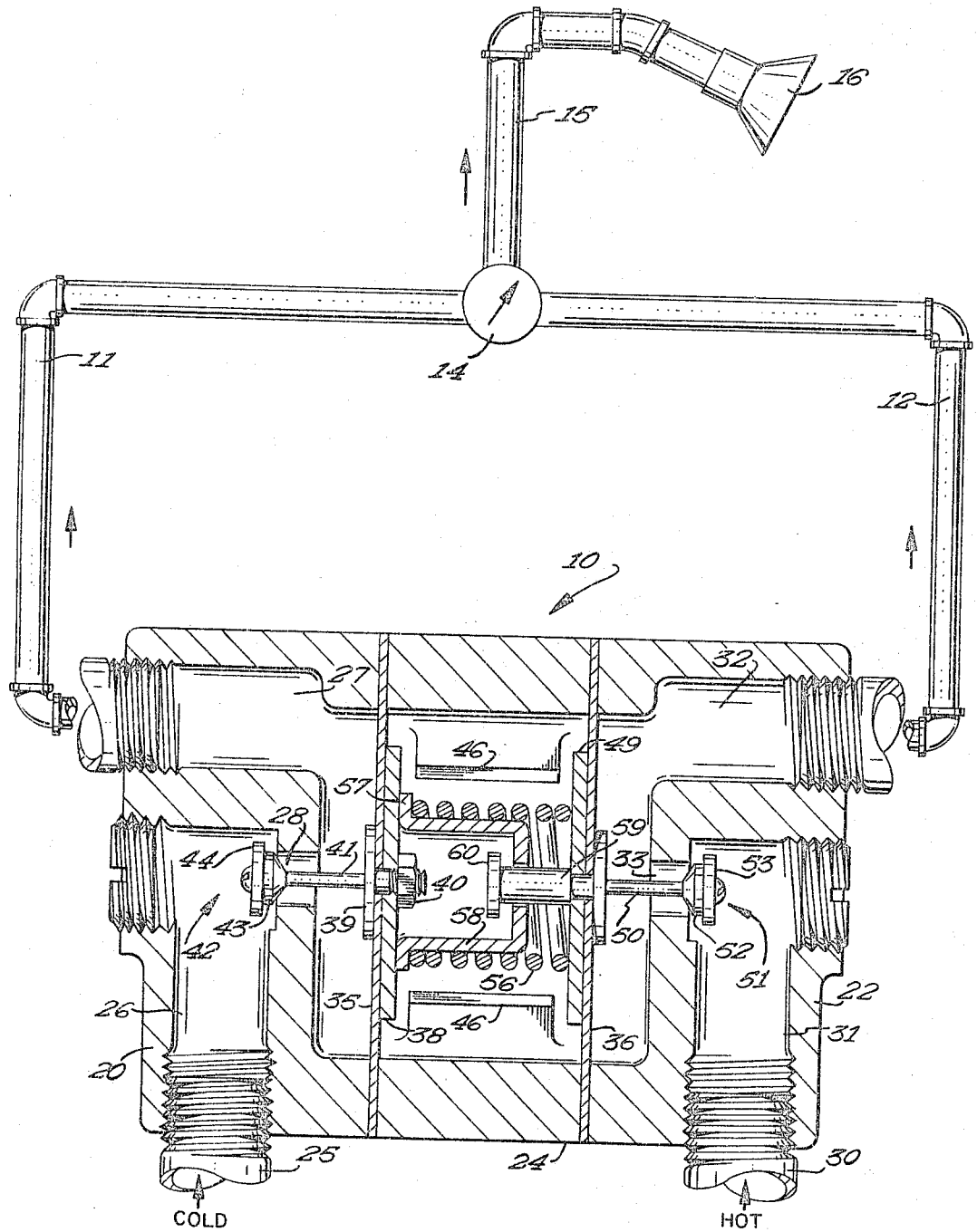

3,324,872
SHOWER CONTROL VALVE
Harold A. Cloud, St. Paul, Minn., assignor to
Honeywell Inc., a corporation of Delaware
Filed Apr. 27, 1964, Ser. No. 362,564
2 Claims. (Cl. 137—98)

The present invention is directed to a shower control valve that will regulate the pressure of hot and cold water delivered to a shower so that temperature of the mixture will not fluctuate with variations in either hot or cold water supply pressure.

It would be desirable, of course, if both temperature and pressure of water delivered from a shower would remain constant at the values selected without further adjustment. This is particularly difficult to attain in practice because pressure of both hot and cold water supplied at the shower location is subject to wide and rapid change. Such changes are due to other uses being made of the water and the resulting pressure drop in the supply pipes. Ordinarily, changes in supply water temperature are very gradual and do not cause serious control problems.

While it is desirable to maintain constant water flow at a selected rate at the shower head, this cannot be done if either of the two supply pressures drops too low. As long as both supply pressures are above that required for the desired flow at the shower head separate pressure regulating valves can be used to supply constant flow. At lower pressures the same proportions of hot and cold water can be maintained, however, by correlating the two pressure regulators so that the higher of the two pressures is reduced to the lower pressure. Thus, while the pressure at the shower head is less than that desired and flow is reduced, the flow ratio of cold to hot water will be maintained and the temperature of the discharged water will be maintained.

The object of the invention is to provide a shower control valve that will deliver hot and cold water at constant pressure when both supply pressures are above a predetermined pressure but will deliver hot and cold water at equal but lower pressures if either supply pressure drops below the predetermined pressure.

A further object is to provide a shower valve that is so constructed as to minimize the possibility of interconnection between the hot and cold water supply pipes in event of failure of either of the pressure sensing members.

The single figure of the drawing shows a pressure regulating valve for controlling the supply of hot and cold water to a shower.

A pressure regulating valve shown generally at 10 maintains equal pressures in a cold water discharge pipe 11 and a hot water discharge pipe 12. These pipes may be connected to a mixing valve 14 which determines the proportions of hot and cold water flowing through a pipe 15 to a shower head 16.

The body of the regulating valve 10 has a cold water valve section 20, a hot water valve section 22, and a center section 24. The center section is generally cylindrical, while the two valve sections are divided into inlet and discharge portions. A cold water supply pipe 25 is shown screw threaded into valve section 20 and communicates with an inlet chamber 26. The discharge pipe 11 is screw threaded into valve section 20 and communicates with a discharge chamber 27. The chambers 26 and 27 are in communication through a valve port 28. A hot water supply pipe 30 is screw threaded into the valve section 22 and is in communication with an inlet chamber 31. The discharge pipe 12 is screw threaded in the casing 22 and communicates with a discharge chamber 32. Chambers 31 and 32 are in communication through a valve port 33.

A flexible diaphragm 35 is secured between the valve section 20 and the center section 24, while a second diaphragm 36 is secured between the center section 24 and the valve section 22. A space within the casing section 24 between the diaphragms 35 and 36 forms a sealed chamber which will differ from atmospheric pressure only due to changes in volume caused by diaphragm movement or changes in temperature, but which will serve to contain water in case either of the two diaphragms should rupture.

The diaphragm 35 is subjected on its left-hand side to cold water discharge while the right-hand side of diaphragm 36 is subjected to hot water discharge pressure. A backing plate 38 lies against the right-hand surface of diaphragm 35 and is secured thereto at the center by a stud 39 and a nut 40. A valve stem 41 extends from the diaphragm and plate assembly through the valve port 28 to a valve disk 42 which consists of a head 43 and a sealing washer 44 which may be of flexible rubber. The valve head 43 consists of a conical portion and a cylindrical portion which is adapted to enter the valve port 28. The rubber washer 44 serves to seal the port when the valve is in its extreme right-hand position. The casing section 24 is formed to provide a plurality of diaphragm stops 46 which engage the backing plate 38. The stops 46 are arranged to limit the diaphragm movement so that the rubber washer 44 will just engage a flat surface of casing section 20 around the port 28. A backing plate 49 lies against the diaphragm 36 and is secured thereto at its central portion. A valve stem 50 extends from the diaphragm and plate assembly through the valve port 33 to a valve disk 51 which comprises a head portion 52 and a sealing washer 53 which may also be of flexible rubber. The valve head consists of a conical portion and a cylindrical portion which is adapted to enter the valve port 33. The rubber washer 53 seals the port when the valve disk is in its extreme left-hand position as determined by engagement of the stops 46 by the backing plate 49.

A coiled compression spring 56 extends between the backing plate 49 and a flange 57 on a cup-shaped member 58. The flange 57 lies against the backing plate 38. A stud 59 extends inwardly from the backing plate 49 through an opening in the cup 58 and has a head 60 within the cup. Inner surface of the cup 58 is adapted to cooperate with the head 60 of the stud 59 providing a linkage to limit expansion of the spring 56. Likewise, the valve stems 41 and 50 together with the backing plates 38 and 49 and the cooperating abutments provided by the cup 58 and the head 60 of stud 59 provide a linkage between the two valve disks which is adapted to limit the extent to which the two valve disks will move in a valve opening direction under the influence of spring 56.

The diaphragm 35 is subject to cold water discharge pressure which tends to move it in a direction to close the cold water valve while spring 56 tends to move the valve in an opening direction. The spring 56 and diaphragm 35 cooperate as a pressure regulator to maintain cold water discharge pressure at a predetermined value. Likewise, the spring 56 and the diaphragm 36 cooperate to regulate the hot water discharge pressure. Thus, hot and cold water discharge pressures are maintained at equal values since the same spring 56 is used for each regulator and the diaphragms are of equal effective area. In effect, these two pressures are separately regulated since there is very little change in spring length when the pressure regulators are functioning as such.

As pointed out above, it often happens that either the hot or cold water supply pressure drops to a value below that desired and below the pressure at which the spring and diaphragms are designed to provide regulation. For example, if the cold water supply pressure should drop excessively, the diaphragm 35 will move to the left under the influence of spring 56 until the port 28 is wide open or until the cooperating abutments provided by the cup 58 and the stud 59 are in engagement. In this condition the spring 56 becomes ineffective to control the hot water regulating valve and the linkage will move to the left to reduce hot water discharge pressure until equal pressures exist on the diaphragms 35 and 36. Therefore, the hot water discharge pressure will be regulated to the pressure of the cold water discharge. In case there was no cold water supply pressure available, the valve linkage will move to close the hot water valve. Obviously, the operation of the linkage would be the same if the hot water pressure should drop below the desired regulated pressure. Likewise, if both supply pressures drop below the desired regulated pressure, the control will be at the pressure of the lower supply pressure.

As mentioned above, the chamber between the diaphragms 35 and 36 is sealed so that leakage through one of diaphragms will merely result in water filling the space betweeen the two diaphragms. In this case the linkage would expand to the limiting position and pressure of discharge from both valves would be regulated at the lower of the two supply pressures. While this will result in a less desirable control of pressure under normal conditions, the valve will still be effective to maintain the desired proportions of hot and cold water at the shower head. Also, as long as one of the diaphragms is intact, there is no possibility of communication through the valve of the two water supplies.

What is claimed is:

1. A pressure control comprising, a housing including first and second pressure regulating valves each of which includes an inlet, an outlet, a valve port therebetween, a valve disk mounted to control flow through said port, a diaphragm responsive to pressure changes in the outlet and a valve stem extending through the port connecting the diaphragm and the valve disk, said diaphragms being axially spaced and axially aligned together with the valve ports, valve disks and valve stems, a spring extending between said diaphragms biasing said diaphragms to move the valve disks away from the valve ports, members carried by each diaphragm extending toward the other, and cooperating abutments on said members limiting the extent of separation of said diaphragms and said valve disks to a maximum valve open flow permitting position upon the occurrence of low supply pressure condition, such that upon the occurrence of a low pressure condition within one of said inlets said spring and abutments position both said diaphragms such that the valve disk controlling the other inlet is positioned by the diaphragms in response to the pressure differential between the two outlets.

2. A pressure control in accordance with claim 1 wherein an enclosure extending between the two diaphragms forms a sealed chamber adapted to contain the controlled fluid in the event of rupture of one of the diaphragms.

References Cited

UNITED STATES PATENTS

| | | | |
|---|---|---|---|
| 549,407 | 11/1895 | Vail | 137—505.41 X |
| 1,798,317 | 3/1931 | Eaton | 137—98 X |
| 2,209,216 | 7/1940 | Wile | 137—505.42 X |
| 3,216,441 | 11/1965 | Thorshein | 137—505.41 X |

FOREIGN PATENTS 325,753   2/1930   Great Britain.

WILLIAM F. O'DEA, *Primary Examiner.*

H. W. WEAKLEY, *Assistant Examiner.*